United States Patent
Haley et al.

(10) Patent No.: US 9,612,766 B2
(45) Date of Patent: Apr. 4, 2017

(54) SYSTEMS AND METHODS FOR SHADOW MIGRATION PROGRESS ESTIMATION

(71) Applicant: Oracle International Corporation, Redwood City, CA (US)

(72) Inventors: Timothy Haley, Boulder, CO (US); Mark Maybee, Boulder, CO (US); Priya Krishnan, Lexington, MA (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 78 days.

(21) Appl. No.: 14/577,702

(22) Filed: Dec. 19, 2014

(65) Prior Publication Data

US 2016/0179435 A1 Jun. 23, 2016

(51) Int. Cl.
  *G06F 12/00* (2006.01)
  *G06F 3/06* (2006.01)

(52) U.S. Cl.
  CPC ............ *G06F 3/0647* (2013.01); *G06F 3/065* (2013.01); *G06F 3/067* (2013.01); *G06F 3/0665* (2013.01); *G06F 3/0685* (2013.01)

(58) Field of Classification Search
  None
  See application file for complete search history.

(56) References Cited

U.S. PATENT DOCUMENTS

| | | | | |
|---|---|---|---|---|
| 8,260,798 B2* | 9/2012 | Schrock | ............ | G06F 17/30079 707/758 |
| 2006/0112247 A1* | 5/2006 | Ramany | ................ | G06F 3/0605 711/165 |
| 2010/0082714 A1* | 4/2010 | Herron | .................. | G06F 3/0619 707/822 |
| 2010/0293412 A1* | 11/2010 | Sakaguchi | .......... | G06F 11/0715 714/17 |
| 2015/0120968 A1* | 4/2015 | Ono | ........................ | G06F 3/067 710/74 |

* cited by examiner

*Primary Examiner* — Daniel Tsui
(74) *Attorney, Agent, or Firm* — Kilpatrick Townsend & Stockton LLP

(57) ABSTRACT

Implementations described and claimed herein provide systems and methods for estimating migration progress. In one implementation, a target file system is initialized to which to migrate existing data from a source file system. An initial amount of data to be migrated to the target file system is estimated based on an examination of in-use space at a root of the source file system. Any mount points for nested file systems in the source file system are identified. An amount of data for each of the nested file systems is estimated based on an examination of in-use space at the mount point for the nested file system. An estimated total amount of data to be migrated from the source file system to the target file system is determined based on the initial amount of data to be migrated and the amount of data for each of the nested file systems.

20 Claims, 8 Drawing Sheets

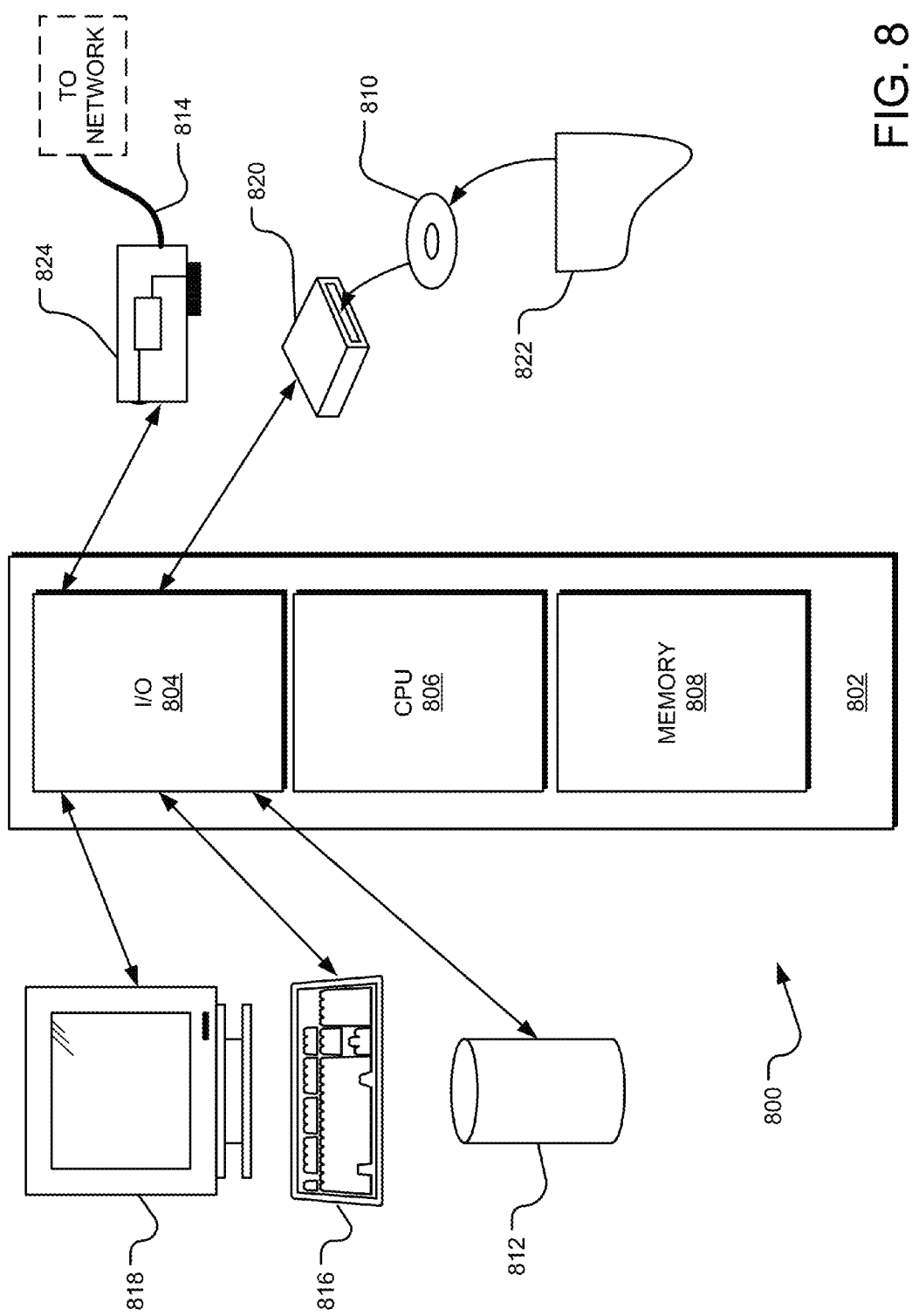

SYSTEMS AND METHODS FOR SHADOW MIGRATION PROGRESS ESTIMATION

TECHNICAL FIELD

Aspects of the present disclosure relate to network file systems utilizing storage appliances and more particularly to systems and methods for estimating progress of migrating existing data on a source to a target.

BACKGROUND

The continuous expansion of the Internet, the expansion and sophistication of enterprise computing networks and systems, the proliferation of content stored and accessible over the Internet, and numerous other factors continues to drive the need for large sophisticated data storage systems. Consequently, as the demand for data storage continues to increase, larger and more sophisticated storage systems are being designed and deployed. Many large scale data storage systems utilize storage appliances that include arrays of storage media. These storage appliances are capable of storing incredible amounts of data. For example, some storage appliances can store over 2 petabytes of data (over 2 quadrillion bytes of data). Moreover, multiple storage appliances may be networked together to form a cluster, which allows for an increase in the volume of stored data.

Storage appliances typically include a file system configured to store and retrieve files and a hierarchical directory structure for the naming of multiple files. In some instances, data on an existing source file system needs to be migrated to a new target file system. Such a migration is typically achieved by initially taking the source file system offline, thereby preventing users from reading or writing to the source file system. Depending on the amount of data in the source file system, the migration may take a significant period of time (e.g., days). The migration process can result in higher latency during the retrieval of files. Additionally, the hardware for the source file system may be in the process of being decommissioned. Based on these considerations, among others, users place an importance on being informed of the progress of a migration and an estimate of the remaining time until completion. However, many conventional estimation techniques are largely arbitrary and based on gross assumptions. For example, conventional estimation techniques may estimate a remaining work percentage based on a number of directory entries migrated, an average number of interior subdirectories, an average depth of leaf directories, and/or how many directories are present in the migration queue and their average depth. Such techniques may approach a relatively accurate estimation of remaining work percentage over time but often significantly fluctuate during migration, frustrating users.

It is with these observations in mind, among others, that various aspects of the present disclosure were conceived and developed.

SUMMARY

Implementations described and claimed herein address the foregoing problems by providing systems and methods for estimating progress of migrating a source to a target. In one implementation, a target file system is initialized on a target storage device to which to migrate existing data from a source file system on a source storage device. A root providing an entry point into the source file system is obtained. The root has a plurality of directory entries, and each of the directory entries corresponds to a virtual node. An initial amount of data to be migrated to the target file system is estimated based on an examination of in-use space at the root of the source file system. During the traversal, it is determined whether each of the virtual nodes is a mount point for a nested file system. An amount of data for each of the nested file systems is estimated based on an examination of in-use space at the mount point for the nested file system. An estimated total amount of data to be migrated from the source file system to the target file system is determined based on the initial amount of data to be migrated and the amount of data for each of the nested file systems.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIG. 8 is an example computing system that may implement various systems and methods discussed herein.

DETAILED DESCRIPTION

A common task for administrators is to move data from one storage location to another. Aspects of the present disclosure involve systems and methods for estimating progress of migrating existing data on a source to a target. Shadow migration involves moving data based on a hierarchy directory structure while permitting user devices to actively access directories and files during migration. The source appears as a single file system with a plurality of nodes in a source directory. The data is migrated by traversing each of the virtual nodes. To estimate an amount of data to be migrated, a system call is performed to the source file system, which returns various system level attributes, including a number of blocks allocated in the file system. Generally, there are a fixed number of bytes per block. Using the bytes per block and the number of blocks allocated for the file system, an estimated data size for migration may be calculated. Stated differently, the amount of data remaining to be migrated may be estimated by examining the in-use space at the root of the source file system. Estimated migration progress, including an estimated time remaining, an estimated percentage complete, and the like, may be calculated based on the estimated data size.

Estimating the amount of data to be migrated from the source becomes complicated where the source appears as a single file system but in reality, the source is a nesting of numerous file systems. Stated differently, each of the virtual nodes may be a file comprising data blocks or a mount point corresponding to a nested file system having a plurality of files comprising data blocks. As mentioned above, the amount of data remaining to be migrated may be estimated by examining the in-use space at the root of the source file system. This estimation, however, would not include the usage of any other file systems nested at the source because this usage is not accounted for in the retrievable data at the root of the source. As such, to obtain a more accurate estimation of the amount of data to be migrated, each virtual node is examined to identify nested mount points. For each of the nested mount points, a system call is performed to the nested file system, which returns various system level attributes, including a number of blocks allocated in the nested file system. Using the bytes per block and the number of blocks allocated for the nested file system, an amount of data for the nested file system may be calculated. The size of the data for the nested file system is added to the previous estimated data size to update the estimated total amount of data for migration and to determine an updated migration progress.

Figure 1:
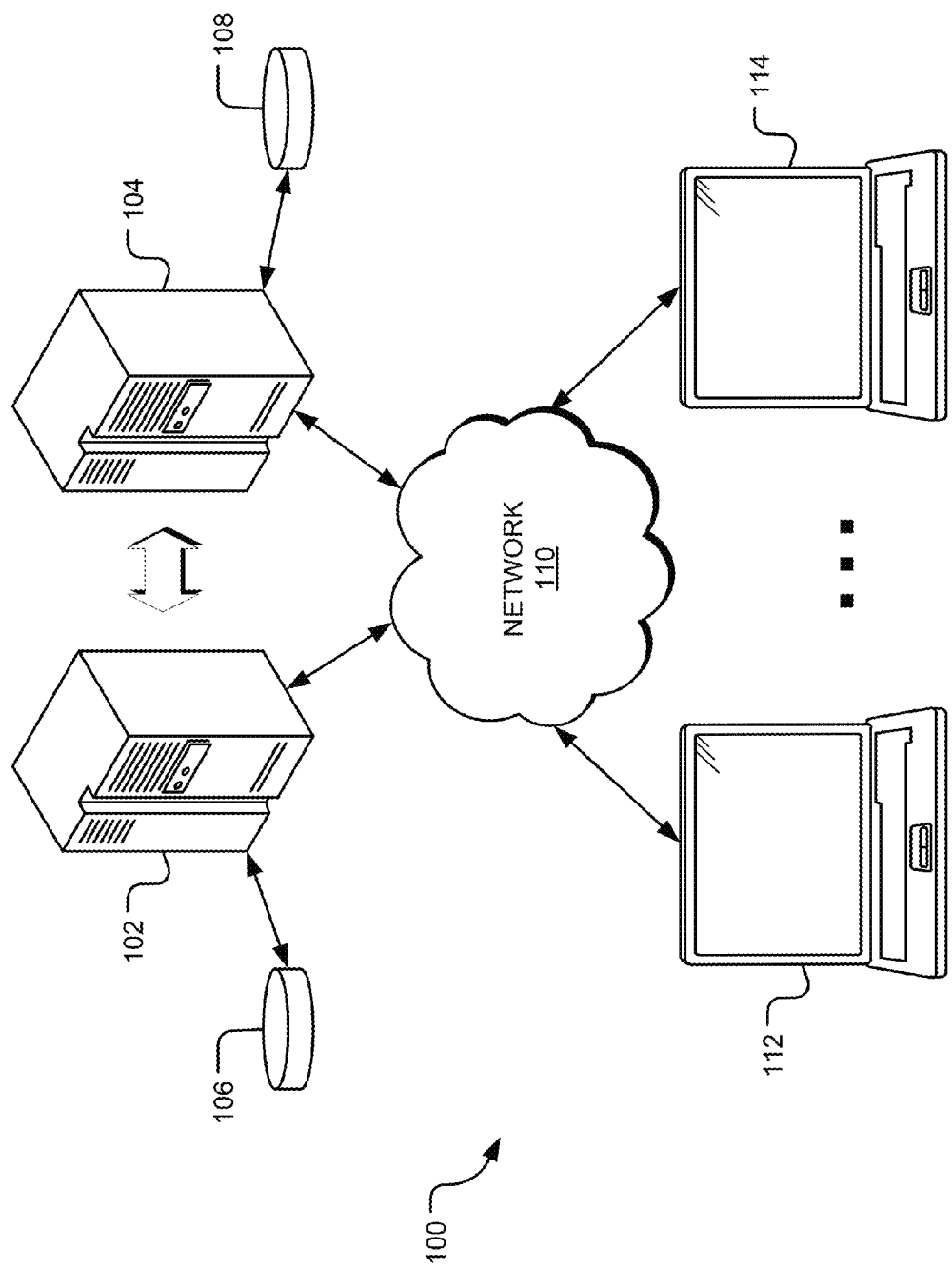
FIG. 1 illustrates an example storage system configured to estimate the progress of a shadow migration from a source to a target.

To begin a detailed description of an example storage system 100 configured to estimate the progress of a shadow migration, reference is made to FIG. 1. As can be understood from FIG. 1, the example storage system 100 includes a source 102 from which data is migrated to a target 104. Generally, the source 102 and the target 104 each manage the storage of data on storage media 106-108, which may involve spinning media (e.g., disc drives) as well as various forms of persistent memory, such as solid state memory. The source 102 may be, without limitation, a network-attached storage (NAS) device, such as a storage appliance, including a file-level storage server providing data access over a network 110 to one or more user devices 112-114 on a client network. The target 104 may be, for example, a storage appliance, such as a ZFS storage appliance, which is a combined file system and volume manager designed by Sun Microsystems® in 2005 and now expanded and advanced by Oracle® that allows for data integrity verification and repair, high storage capacities, along with numerous other features and advantages. Although discussed herein in the context of a NAS device and a ZFS storage appliance, the source 102 and the target 104 may each be any storage device.

In one implementation, the storage system 100 includes a client network having one or more user devices 112-114. Storage devices may be accessible by the client network using the network 110. It will be appreciated, however, that the various networks may comprise an integrated network, and the connections between the networks represent but one possible network topology. The various networks may also be local in nature or geographically dispersed, such as with large private enterprise networks or the Internet. The user devices 112-114 are generally any form of computing device capable of interacting with the network 110, such as a terminal, a workstation, a personal computer, a portable computer, a cellphone, a mobile device, a tablet, a multimedia console, and the like. In some implementations, the client network includes one or more user interfaces, including, for example, a business user interface (BUI), permitting a user to interact with a storage device to access data.

ZFS based systems utilize a storage pool layer having one or more storage pools (often referred to as "zpools") comprising virtual devices (vdevs) constructed of block devices, such as the storage media 106-108. A block device is any device that moves data in the form of blocks, which may be, without limitation, hard disk drives, solid state drives, optical drives, magnetic drives, and other addressable regions of memory. A ZFS volume is a dataset that represents a single block device. A virtual device may span a number of block devices or volumes, and a storage pool may include one or more virtual devices, each including one or more partitions of storage media or one or more storage media.

Traffic to and from the source 102 or the target 104 is typically managed by one or more dedicated storage servers located within the source 102 or the target 104 or a storage network. A common protocol employed by storage appliances for accessing content, including files, directories, and their associated metadata is a Network File System (NFS). NFS is a widely used distributed file system protocol, originally developed by Sun Microsystems® in 1984 and currently in version 4 (NFSv4) from Oracle®. NFS allows the client network to access stored data seamlessly by providing a programming interface permitting the user devices 112-114 to: create and delete files; read and write files; perform seeks within a file; create and delete directories; manage directory contents; and perform other file, directory, or content operations. The operating system utilized by the user devices 112-114 is configured to communicate with the NFS programming interface to manage the file system and the interaction between executing applications with data residing in the source 102 or target 104. Generally, NFS systems manage file system metadata and provide access to files and directories. The metadata describes the location of the files and directories on the storage media 106, 108. A storage appliance maintains a log of current operations being performed by the client network.

It is common for an administrator of the storage system 100 to move existing data from one storage location to another. Shadow migration is a process for migrating data from the source 102, which may include one or more external NAS sources, to the target 104, which may be a ZFS storage appliance. This is often used, for example, when the target 104 is introduced into an existing environment to take over file sharing duties of the source 102, in some cases, with the intent of replacing or decommissioning the source 102 once the migration is complete.

Shadow migration may be integrated into the target 104 without requiring a separate physical machine. In one implementation, the target 104 creates shares that are configured to shadow an existing directory on the source 102, either locally or over NFS. In this implementation, access to the data by the user devices 112-114 is limited only one time, where the source 102 is placed into read-only mode, a share is created with the shadow property set, and the user devices 112-114 are updated to point to the new share on the target 104. The user devices 112-114 can then access the target 104 in read-write mode.

Once the shadow property is set, data is transparently migrated in the background from the source 102 locally. If one of the user devices 112-114 issues a request for a file that has not yet been migrated, the target 104 will automatically migrate the requested file to the local server before responding to the request. This may incur higher latency for some requests, but once a file has been migrated to the target 104, all accesses are local to the target 104 and have native performance. In one implementation, a current working set for a file system is much smaller than the total size, so once the target 104 migrates the working set, regardless of the total native size on the source 102, there will be substantially no impact on performance perceived by the user devices 112-114. In addition to the increased latency, portions of the data exist in two locations (i.e., the source 102 and the target 104) during the migration, thereby complicating backups and resulting in snapshots that may be incomplete and/or exist only on the source 102 or the target 104. These issues, among other considerations, often prompt users to closely monitor the progress of migration.

In one implementation, monitoring the process of a shadow migration involves an estimate of the amount of data on the source 102 for migration. The target 104 can shadow all or part of a file system or multiple file systems with nested mount points. Where the target 104 is shadowing a single file system on the source 102 for migration, estimating migration progress is relatively straightforward based on an examination of the in-use space at the root of the source 102. This is because the file system in this instance may comprise a relatively uniform directory tree. Many file systems, including, but not limited to, UNIX-based file systems, track data and stacks associated with the file system. As such, a system call by the target 104 to the source 102, in this case, will return a number of blocks allocated to the file system on the source 102. Generally, there are a fixed number of bytes per block (e.g., 512 bytes per block). In one implementation, using the bytes per block and the number of blocks allocated for the file system on the source 102, the target 104 calculates an estimated data size for migration. Stated differently, where a single file system is being migrated from the source 102, the target 104 obtains a size of the file system at a block level granularity, thereby providing an estimation of a total amount of data for migration.

Based on the estimated total amount of data for migration, the target 104 may calculate other migration progress attributes, including, without limitation, an estimated time remaining, an estimated percentage complete, and the like. In one implementation, the target 104 tracks the amount of bytes that have been transferred from the source 102 to the target 104 and has an indication of the approximate rate of transfer. Using the amount of transferred bytes and the estimated total amount of data for migration (in bytes), the target 104 calculates an estimated percentage complete, and using the estimated total total amount of data for migration and the rate of transfer, the target 104 calculates the estimated time remaining.

Estimating the amount of data to be migrated may be complicated where the source 102 includes an NFS mount point encompassing one or more nested filed systems. In this case, examining the in-use space at the root of the source 102 based on an assumption of a relatively uniform directory tree fails to provide an accurate estimation of migration progress. This is because a system call for the data amount only returns the size of the specific file system for which the system call is issued. Thus, the target 104 is unable to estimate whether there is any data below this hierarchy level in nested file systems. For example, the source 102 could have a relatively shallow file system tree but have large amounts of data in a single directory (e.g., a nested mount point) that is visited last during the migration as the target 104 traverses the tree. In this scenario, the migration will appear almost complete and then rapidly drop to a very small percentage complete as this new tree is discovered. Conversely, if that large directory was processed first, then the target 104 may assume that all other directories have a similarly large amount of data, and when the target 104 finds them mostly empty during traversal, the estimate quickly rises from a small percentage complete to nearly complete.

In one implementation, to account for potential nested file systems, a unique identification of the source file system is checked at every directory during traversal of the tree. Where the identification of the source file system is new, the identification is recorded persistently at the target 104. The amount of data used on the source file system is determined and added to the total amount of data for migration from the source 102. In one implementation, the target 104 updates the total amount of data for migration and the estimated migration progress in real time during traversal.

In other words, the target 104 initially migrates directories from the source 102 before migrating the files corresponding to lower hierarchy levels in the tree. During this process, the target 104 analyzes each directory to determine whether the directory is a mount point for a nested file system. If the target 104 identifies a mount point, the target 104 issues a system call to obtain the amount of data in the nested file system. The target 104 adds the amount of data in the nested file system to the total amount of data to be migrated and updates the migration progress estimate. Stated simply, the target 104 performs a system call for the root of the source 102 to obtain a total amount of data to be migrated. As the target 104 traverses the tree, the target 104 issues a system call for any mount points and adds the amount of data corresponding to each mount point to the total amount of data to be migrated. The total amount of data to be migrated is thus updated as the target 104 traverses the tree. Based on the total amount of data to be migrated, in one implementation, the target 104 updates the estimated migration progress.

Figure 2:
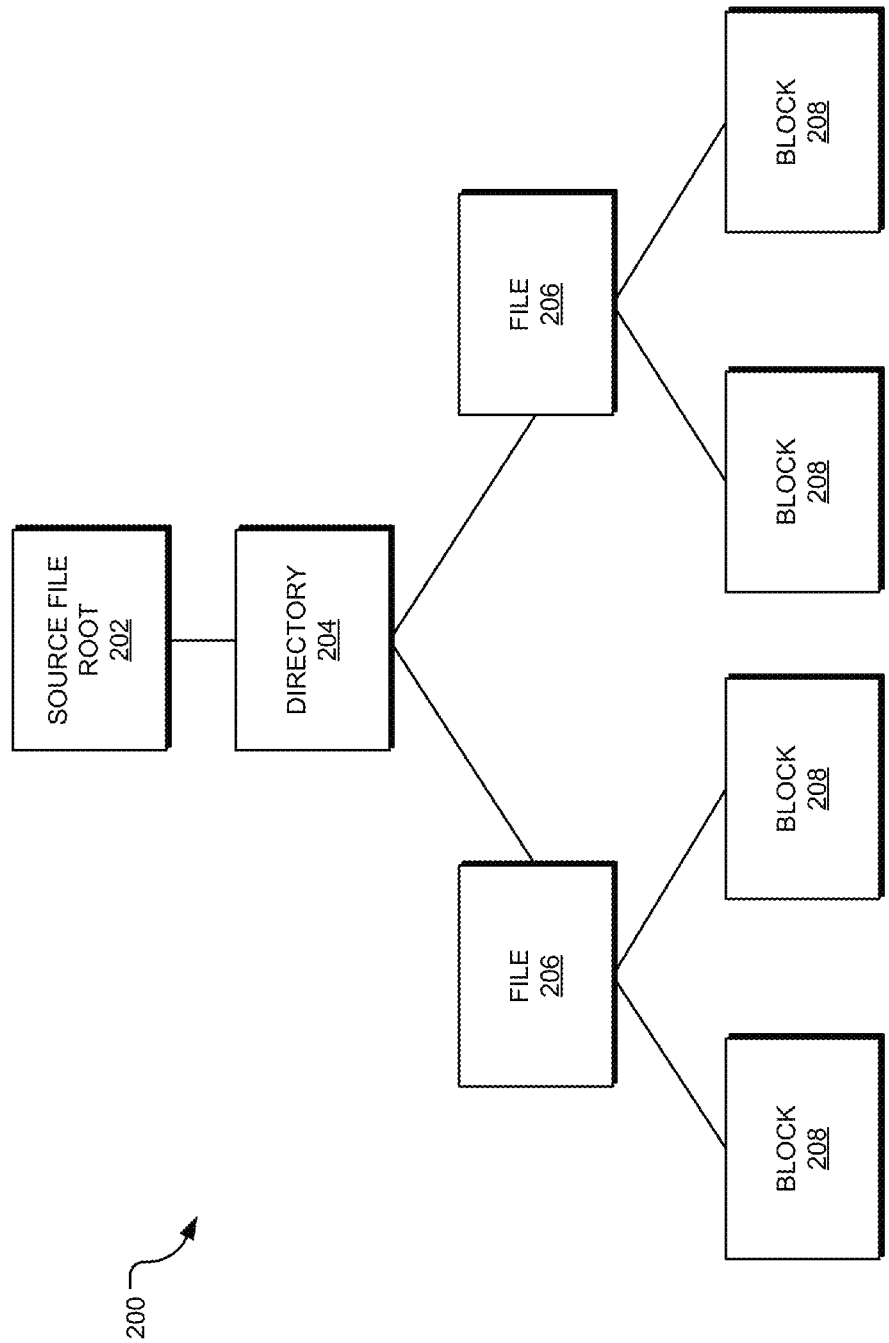
FIG. 2 depicts an example source file system structure for migration.

Turning to FIG. 2, an example source file system structure 200 for migration from the source 102 to the target 104 is shown. In one implementation, the source file system structure 200 includes a file system root 202, which is an entry point into the file system on the source 102. The source file system includes directory entries for a plurality of directories, sub-directories, files, and/or other virtual nodes. In the example shown in FIG. 2, the source file system includes a directory entry for a directory 204, and the directory entry for the directory 204 further includes directory entries for a plurality of files 206. Each of the file system root 202 and the directory 204 include corresponding metadata. Each of the files 206 include file metadata and data blocks 208.

To migrate the data from the source 102, the target 104 traverses the source file system structure 200 according to a hierarchy of the directory entries for the file system root 202. For example, as shown in FIG. 2, the target 104 migrates the directory 204 followed by each of the entries for the directory 204, including each of the files 206 and their corresponding data blocks 208.

In one implementation, to estimate a progress of migrating the source file system, upon mounting the file system root 202, the target 104 determines a total amount of data to be migrated from the source 102 based on an estimation of an in-use space at the file system root 202. For example, the target 104 may query the source 102 for the number of blocks 208 allocated in the source file system based on the entries in the directory 204. Using the number of blocks 208 and a block size (e.g., bytes per block), the target 104 calculates a total amount of data to be migrated (e.g., in bytes). Based on the total amount of data to be migrated, the target 104 may estimate a time until completion and/or other migration process attributes. Because the source file system structure 200 shown in FIG. 2 does not contain any nested mount points, the total amount of data to be migrated calculated based on the in-use space at the file system root 202 provides a reliable estimate. As the target 104 traverses each of the entries in the directory 204 and migrates the corresponding data, the target 104 updates the estimation of migration progress to provide current estimates of time remaining, percentage complete, bytes remaining, and/or other migration progress attributes.

Figure 3:
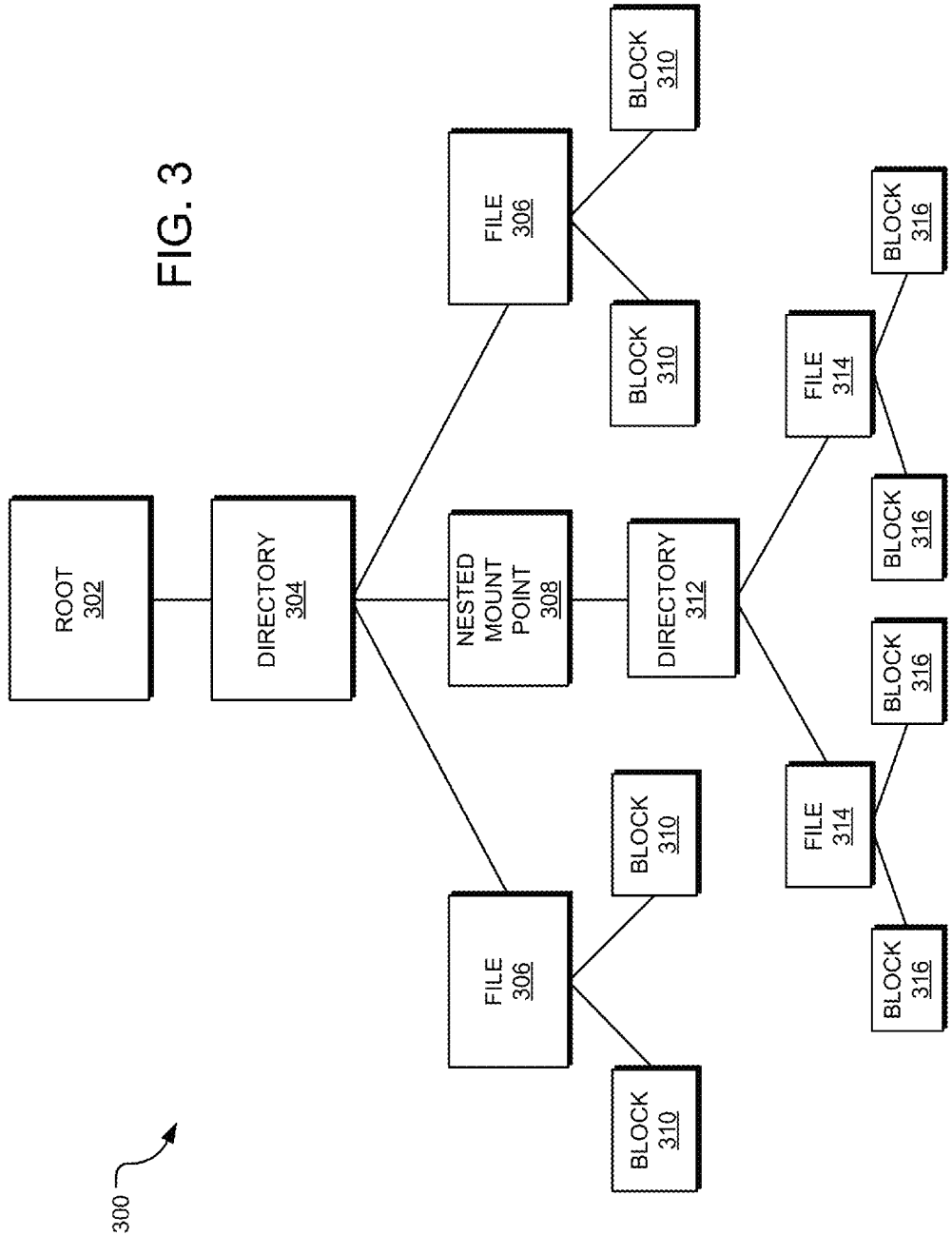
FIG. 3 shows an example source mount point structure for migration.

As can be understood from FIG. 3, a source mount point on the source 102 may encompass one or more nested filed systems. In one implementation, a source mount point structure 300 for migrating data from the source 102 to the target 104 includes a root 302 for entry into a source file system. The source file system includes directory entries for a plurality of directories, sub-directories, files, and/or other virtual nodes, such as nested file systems. In the example shown in FIG. 3, the source file system includes directory entry for a directory 304, and the directory entry for the directory 304 further includes directory entries for a plurality of files 306 and a nested mount point 308. Each of the root 302 and the directory 304 include corresponding metadata, and each of the files 306 include file metadata and data blocks 310.

In one implementation, the nested mount point 308 provides entry into a nested file system, including directory entries for a plurality of directories, sub-directories, files, and/or other virtual nodes. For example, as shown in FIG. 3, the nested file system includes directory entry for a directory 312 naming directory entries for a plurality of files 314. Each of the nested mount point 308 and the directory 312 include corresponding metadata, and each of the files 314 include file metadata and data blocks 316. Although the root 302 is shown with a directory having a single nested mount point, it will be appreciated that there may be any number of directories, sub-directories, files, and/or other virtual nodes, such as nested file systems in the source mount point structure 300.

To migrate the data from the source 102, the target 104 traverses the source mount point structure 300 according to a hierarchy of the directory entries for the root 302. For example, as shown in FIG. 3, the target 104 migrates the directory 304 followed by each of the entries for the directory 304, including each of the files 306 and their corresponding data blocks 308. In one implementation, to estimate a progress of migrating the source file system, upon mounting the root 302, the target 104 determines an initial amount of data to be migrated from the source 102 based on an estimation of an in-use space at the root 302. For example, the target 104 may query the source 102 for the number of blocks 310 allocated in the source file system based on the entries in the directory 304. Using the number of blocks 310 and a block size (e.g., bytes per block), the target 104 calculates the initial amount of data to be migrated (e.g., in bytes). Based on the initial amount of data to be migrated, the target 104 may estimate a time until completion and/or other migration process attributes.

Once the target 104 encounters the nested mount point 308 during traversal of the directory entries in the directory 304, the target 104 populates the directory entries for the nested mount point 308, including the directory 312 and the entries for the directory 312 naming the files 314. In one implementation, upon populating the directory 304 for the nested mount point 308, the target 104 determines an amount of data in the nested file system based on an estimation of an in-use space at the nested mount point 308. For example, the target 104 may query the nested file system for the number of blocks 316 allocated in the nested file system based on the entries in the directory 312. Using the number of blocks 316 and a block size (e.g., bytes per block), the target 104 calculates the amount of data in the nested file system (e.g., in bytes). The target 104 adds the amount of data in the nested file system to the initial amount of data to be migrated to obtain a total amount of data to be migrated from the source 102. The target 104 adds the amount of data for each nested file system encountered to the total amount of data to be migrated to obtain an updated amount of data to be migrated. As the target 104 traverses each of the directory entries and migrates the corresponding data, the target 104 updates the estimation of migration progress to provide current estimates of time remaining, percentage complete, bytes remaining, and/or other migration progress attributes.

Figure 4:
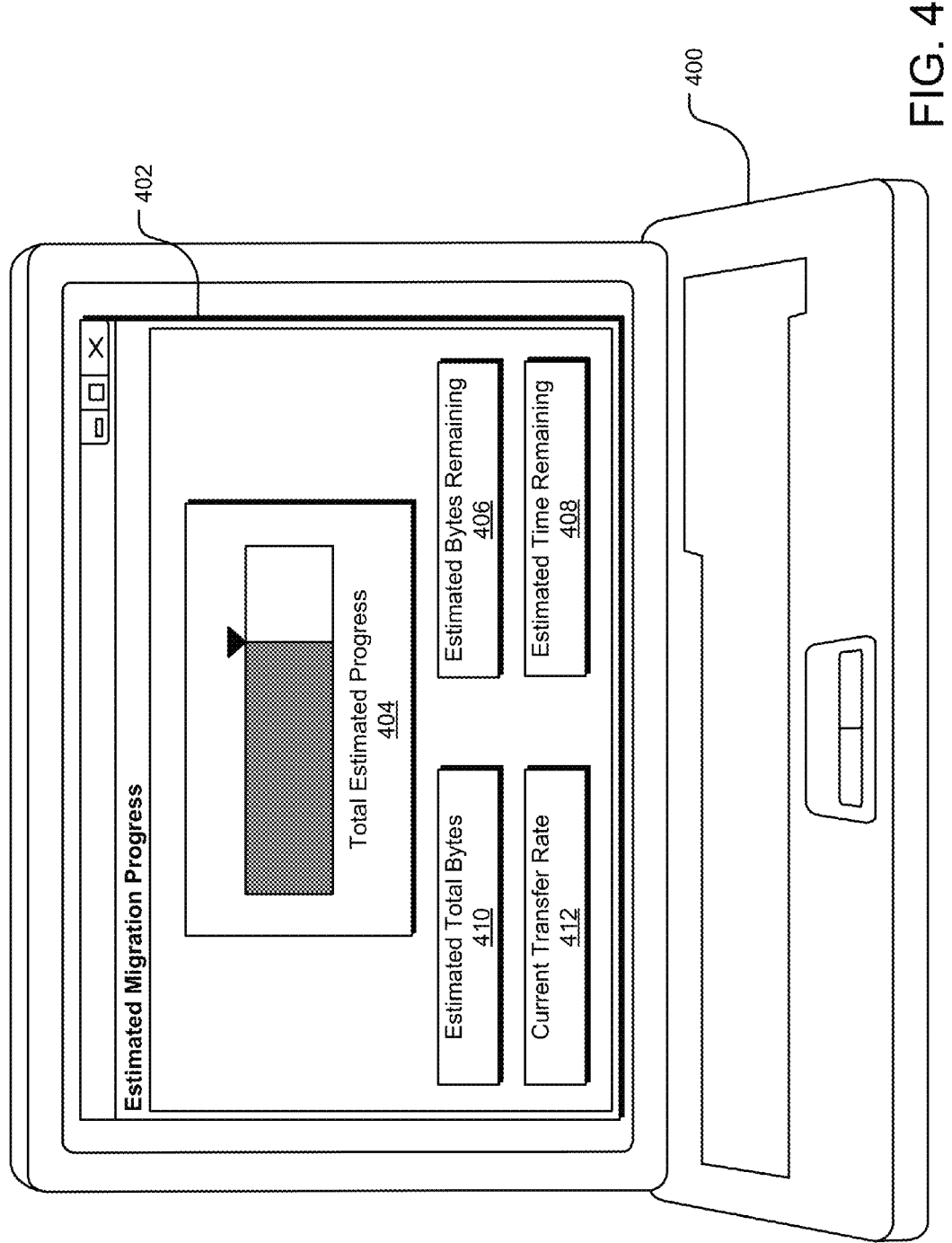
FIG. 4 shows an example user interface showing estimated migration progress attributes.

Referring to FIG. 4, in one implementation, estimated migration progress attributes are available through a user interface, such as the BUI, and displayed in a window 402 on one or more of the user devices 112-114, such as a computer 400. The estimated migration progress attributes may be accessible through file system properties of the target 104 and/or properties of a shadow migration node in the storage system 100.

In one implementation, the window 402 presents the estimated migration progress attributes graphically in a user-friendly format. For example, the estimated migration progress attributes may be displayed as graphs, charts, tables, data values, visual indicators, and/or the like. In one implementation, the estimated migration progress attributes are updated in substantially real time during migration, as described herein. The estimated migration progress attributes may include a variety of information corresponding to the progress of migrating data from the source 102 to the target 104, including, without limitation, a total estimated progress 404 (e.g., as a percentage complete), an estimated bytes remaining 406, and an estimated time remaining 408. In one implementation, the window 402 also displays information regarding the migration including, but not limited to, an estimated total bytes 410 specifying an updated total amount of data to be migrated and a current transfer rate 412 specifying the rate at which the data is migrated from the source 102 to the target 104. It will be appreciated by those skilled in the art that other estimated migration progress attributes and/or other information regarding the migration may be calculated and displayed in the window 402.

Figure 5:
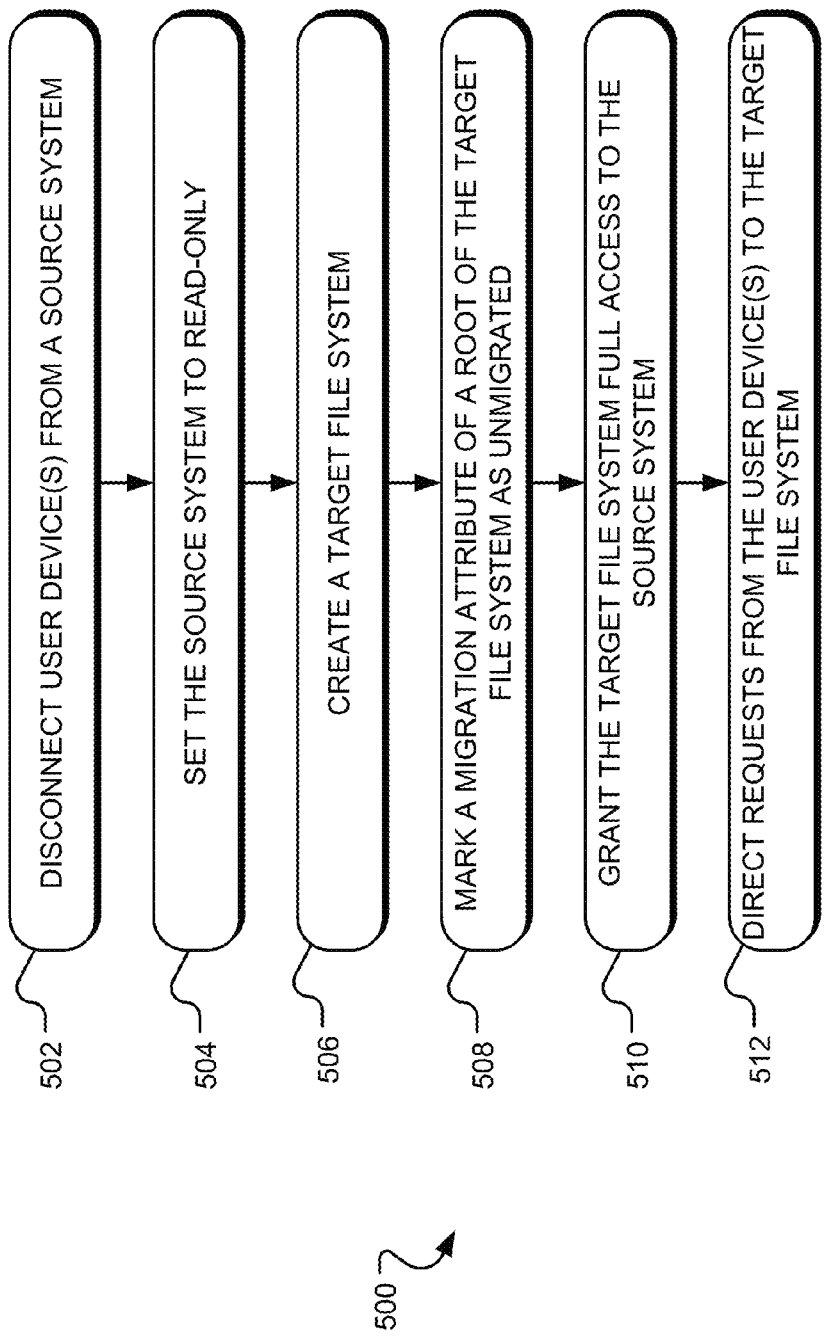
FIG. 5 illustrates example operations for initializing a target for migrating data from a source.
Figure 6:
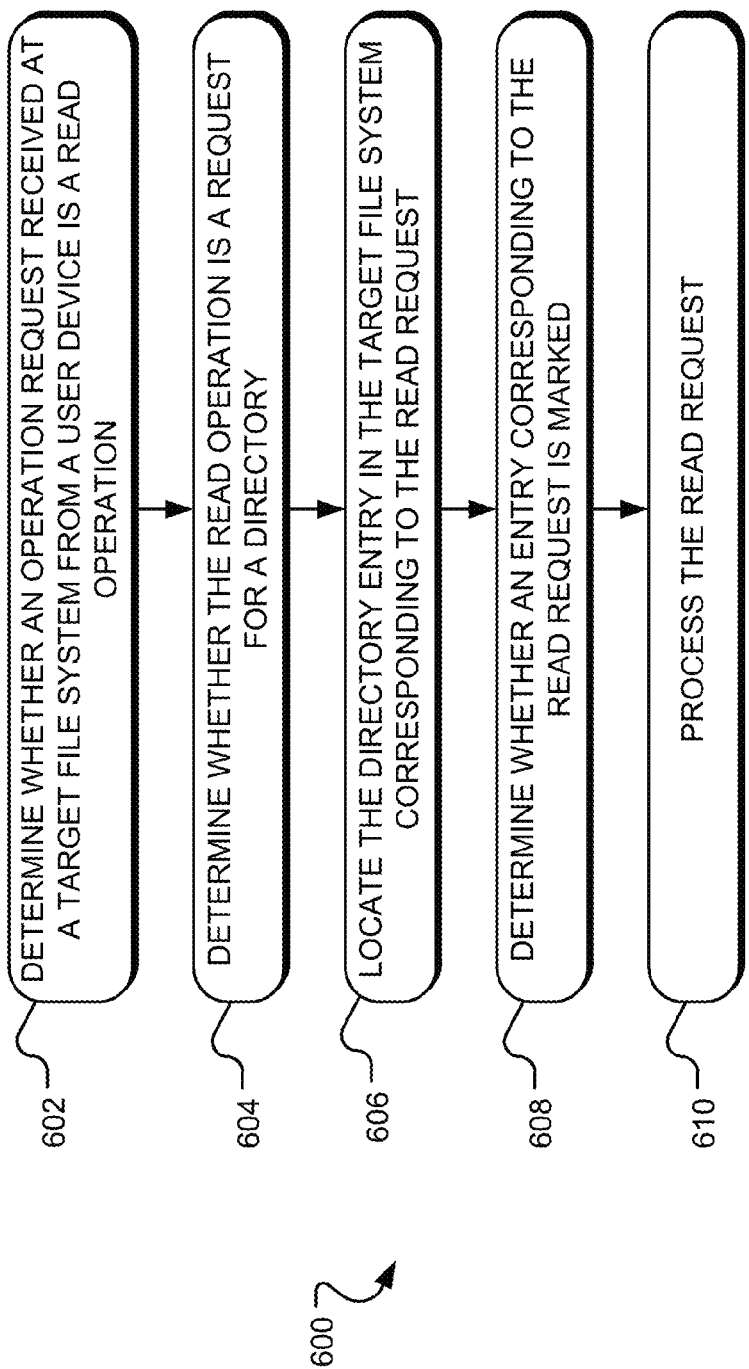
FIG. 6 shows example operations for migrating data in the background from a source to a target.

For a detailed description of example operations for migrating data from a source to a target, reference is made to FIGS. 5 and 6. Turning first to FIG. 5, example operations 500 for initializing a target for migrating data from a source are shown. In one implementation, an operation 502 disconnects one or more user devices from a source file system. The operation 502 may include disconnecting user devices currently accessing the source file system and/or denying new file system operation requests to the source.

Once the operation 502 disconnects the user device(s), in one implementation, an operation 504 sets the source file system to read-only, and an operation 506 creates a target file system on the target. An operation 508 marks a migration attribute of a root of the target file system to "un-migrated," and an operation 510 grants the target on which the target file system is located access to the source file system. In one implementation, the operation 510 grants the target full access to the source file system. In another implementation, the operation 510 grants partial access to the source file system. An operation 512 redirects file system operation requests issued to the source file system to the target file system. Additionally, the operation 512 directs new file system requests to the target file system.

Referring to FIG. 6, example operations 600 for migrating data in the background from a source to a target, while permitting file system operation requests by one or more users, are illustrated. In one implementation, following the operations 500 to initialize the target, an operation 602 determines whether a file system operation request received at the target file system from a user device is a read request. Where the operation 602 determines that the operation request is not a read request (e.g., a write request), the file system operation request is processed from the target file system.

In one implementation, where the operation 602 determines that the file system operation request is a read request, an operation 604 determines whether the read operation is a request for a directory. If the operation 604 determines the read request is not for a directory (e.g., for a file), an operation 606 locates a directory entry for the requested file in the target file system. If the operation 604 determines that the read operation is a request for a directory, the operation 606 locates a directory entry corresponding to the requested directory in the target file system. In one implementation, the directory entry includes a migration attribute indicating whether the file/directory has been migrated to the target file system.

An operation 608 determines whether the migration attribute in the directory entry corresponding to the read request is marked (i.e., whether the file/directory has been migrated). In one implementation, where the operation 608 determines that the migration attribute is unmarked, the file/directory corresponding to the read request are migrated to the target file system, and an operation 610 processes the read request from the target file system. Where the operation 608 determines that the migration attribute is marked, the file/directory corresponding to the read request has not yet been migrated to the target file system. In the case of a read request for a file, the file data is migrated to the target file system and the migration attribute for the file is unmarked. The operation 610 then processes the read request for the file from the target file system. In the case of a read request for a directory, the metadata for content in the directory is obtained from the source file system, and a directory entry is created in the directory in the target file system for each file, sub-directory, nested file system, and the like. Once the data is migrated to the target file system, the migration attribute for the directory entry for the directory is unmarked, and the operation 610 processes the read request for the directory from the target file system. As such, during migration of data from the source to the target, the user device(s) may continue to access the data through file system operation requests.

Figure 7:
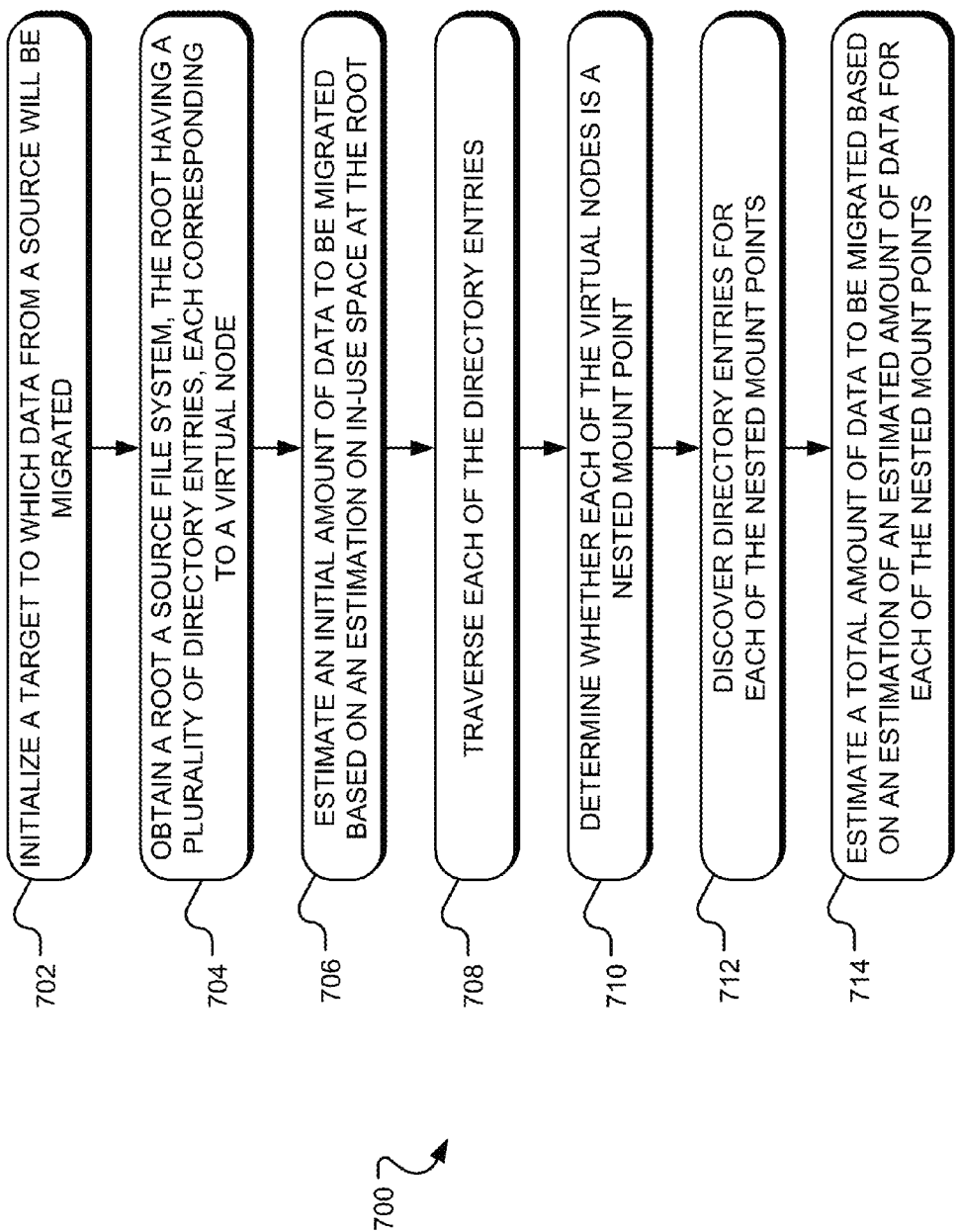
FIG. 7 illustrates example operations for estimating progress of migrating data from a source to a target.

As can be understood from FIG. 7, example operations 700 for estimating progress of migrating data from a source to a target are shown. In one implementation, an operation 702 initializes a target to which data from a source will be migrated. The operation 702 may initialize the target, for example, according to the operation 500 discussed with respect to FIG. 5. However, it will be appreciated that other methods of initializing the target may be employed.

To begin migration, an operation 704 obtains a root for a source file system located on the source. The root provides an entry point into the source file system. In one implementation, the root has a plurality of directory entries, each corresponding to a virtual node, which is a representation of a file, directory, nested mount point, or the like. An operation 706 estimates an initial amount of data to be migrated from to the target based on an estimation of in-use space at the root of the source file system. In one implementation, the operation 706 estimates the in-use space at the root of the source file system based on a number of blocks allocated in the source file system and a number of bytes per block. The operation 706 may obtain the number of allocated blocks, for example, using a system call to the source file system for file system attributes, based on standard system level information corresponding to the source file system (e.g., obtained via NFS), or the like. Based on the initial amount of data to be migrated, initial estimated migration progress attributes may be calculated, including, but not limited to, a time remaining, an amount of data remaining, and the like. During migration, users may continue to access data through file system operation requests, for example, using the operations 600, described with respect to FIG. 6.

An operation 708 traverses each of the directory entries in the source file system. In one implementation, as the operation 708 traverses the directory entries, an operation 710 determines whether each of the nodes corresponding to the directory entries is a nested mount point. A kernel manages the file system requests and translates them into data processing instructions for controlling the resources on the target. In one implementation, the operation 710 identifies a flag in the kernel for each directory entry indicating whether the directory entry corresponds to a nested mount point. For each nested mount point identified by the operation 710, an operation 712 discovers and populates directory entries for the nested file system, including one or more directories and entries naming corresponding files.

In one implementation, upon populating the directory entries for each nested mount point with the operation 712, an operation 714 estimates a total amount of data to be migrated based on an estimated amount of data for each nested mount point and the initial amount of data to be migrated. The operation 714 may determine an amount of data in each nested file system based on an estimation of an in-use space at a root of the nested mount point. For example, the operation 714 may query the nested file system for the number of blocks allocated in the nested file system based on the directory entries for the nested file system. Using the number of blocks and a block size (e.g., bytes per block), the operation 714 calculates the amount of data in the nested file system (e.g., in bytes) and adds the amount of data in the nested file system to the initial amount of data to be migrated to obtain a total amount of data to be migrated. The operation 714 adds the amount of data for each nested file system encountered to the total amount of data to be migrated to obtain an updated amount of data to be migrated. Using the updated amount of data to be migrated, estimated migration progress attributes may be calculated to provide current estimates of time remaining, percentage complete, bytes remaining, and/or other migration progress attributes.

Referring to FIG. 8, a detailed description of an example computing system 800 having one or more computing units that may implement various systems and methods discussed herein is provided. The computing system 800 may be applicable to the source 102, the target 104, the user devices 112-114, or other computing devices. It will be appreciated that specific implementations of these devices may be of differing possible specific computing architectures not all of which are specifically discussed herein but will be understood by those of ordinary skill in the art.

The computer system 800 may be a general computing system is capable of executing a computer program product to execute a computer process. Data and program files may be input to the computer system 800, which reads the files and executes the programs therein. Some of the elements of a general purpose computer system 800 are shown in FIG.

8 wherein a processor 802 is shown having an input/output (I/O) section 804, a Central Processing Unit (CPU) 806, and memory 808. There may be one or more processors 802, such that the processor 802 of the computer system 800 comprises a single central-processing unit 806, or a plurality of processing units, commonly referred to as a parallel processing environment. The computer system 800 may be a conventional computer, a distributed computer, or any other type of computer, such as one or more external computers made available via a cloud computing or other network architecture. The presently described technology is optionally implemented in software devices loaded in memory 808, stored on a configured DVD/CD-ROM 810 or storage unit 812, and/or communicated via a wired or wireless network link 814, thereby transforming the computer system 800 in FIG. 8 to a special purpose machine for implementing the described operations.

The I/O section 804 is connected to one or more user-interface devices (e.g., a keyboard 816 and a display unit 818), the storage unit 812, and/or a disc drive unit 820. In the case of a tablet or smart phone device, there may not be a physical keyboard but rather a touch screen with a computer generated touch screen keyboard. Generally, the disc drive unit 820 is a DVD/CD-ROM drive unit capable of reading the DVD/CD-ROM 810, which typically contains programs and data 822. Computer program products containing mechanisms to effectuate the systems and methods in accordance with the presently described technology may reside in the memory section 804, on the disc storage unit 812, on the DVD/CD-ROM 810 of the computer system 800, or on external storage devices with such computer program products, including one or more database management products, web server products, application server products, and/or other additional software components. Alternatively, the disc drive unit 820 may be replaced or supplemented by an optical drive unit, a flash drive unit, magnetic drive unit, or other storage medium drive unit. Similarly, the disc drive unit 8520 may be replaced or supplemented with random access memory (RAM), magnetic memory, optical memory, and/or various other possible forms of semiconductor based memories commonly found in smart phones and tablets.

The network adapter 824 is capable of connecting the computer system 800 to a network via the network link 814, through which the computer system can receive instructions and data and/or issue file system operation requests. Examples of such systems include personal computers, Intel or PowerPC-based computing systems, AMD-based computing systems and other systems running a Windows-based, a UNIX-based, or other operating system. It should be understood that computing systems may also embody devices such as terminals, workstations, mobile phones, tablets or slates, multimedia consoles, gaming consoles, set top boxes, etc.

When used in a LAN-networking environment, the computer system 800 is connected (by wired connection or wirelessly) to a local network through the network interface or adapter 824, which is one type of communications device. When used in a WAN-networking environment, the computer system 800 typically includes a modem, a network adapter, or any other type of communications device for establishing communications over the wide area network. In a networked environment, program modules depicted relative to the computer system 800 or portions thereof, may be stored in a remote memory storage device. It is appreciated that the network connections shown are examples of communications devices for and other means of establishing a communications link between the computers may be used.

In an example implementation, shadow migration software and other modules and services may be embodied by instructions stored on such storage systems and executed by the processor 802. Some or all of the operations described herein may be performed by the processor 802. Further, local computing systems, remote data sources and/or services, and other associated logic represent firmware, hardware, and/or software configured to control data access. Such services may be implemented using a general purpose computer and specialized software (such as a server executing service software), a special purpose computing system and specialized software (such as a mobile device or network appliance executing service software), or other computing configurations. In addition, one or more functionalities of the systems and methods disclosed herein may be generated by the processor 802 and a user may interact with a Graphical User Interface (GUI) using one or more user-interface devices (e.g., the keyboard 816, the display unit 818, and the user devices 112-114) with some of the data in use directly coming from online sources and data stores. The system set forth in FIG. 8 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for estimating migration progress, the method comprising:
    initializing a target file system on a target storage device to which to migrate existing data from a source file system on a source storage device;
    traversing, by the target storage device, the source file system to identify a root and a plurality of directory entries within the root, wherein each of the plurality of directory entries corresponds to a virtual node, and wherein the root provides an entry point into the source file system;
    estimating, by the target storage device, an initial amount of data to be migrated to the target file system based on an examination of in-use space at the root of the source file system;
    while traversing the source file system, identifying, by the target storage device, a virtual node that corresponds to a directory entry of the plurality of directory entries as a mount point for a nested file system;
    estimating, by the target storage device, an amount of data for the nested file system based on in-use space at the mount point for the nested file system;
    determining, by the target storage device, an estimated total amount of data to be migrated from the source file system to the target file system based on the initial amount of data to be migrated and the amount of data for the nested file system; and
    transmitting, to a user device by the target storage device, the estimated total amount of data to be migrated from the source file system to the target file system.

2. The method of claim 1, wherein the virtual node represents a directory or a file.

3. The method of claim 1, wherein the source storage device includes one or more external network-attached storage sources.

4. The method of claim 1, wherein the target storage device is a storage appliance.

5. The method of claim 1, wherein the initial amount of data to be migrated is estimated based on a number of data blocks allocated for the source file system.

6. The method of claim 1, wherein the amount of data for the nested file system is estimated based on a number of data blocks allocated for the nested file system.

7. The method of claim 1, further comprising:
    populating the directory entry for the nested file system upon identifying the virtual node that corresponds to the directory entry as the mount point for the nested file system.

8. The method of claim 1, further comprising:
    generating one or more estimated migration progress attributes based on the estimated total amount of data to be migrated.

9. The method of claim 8, wherein the estimated migration progress attributes include an estimated time remaining.

10. The method of claim 8, wherein the estimated migration progress attributes include an estimated percentage completed.

11. The method of claim 1, wherein the estimated total amount of data to be migrated is a sum of the initial amount of data to be migrated and the amount of data for the nested file system.

12. The method of claim 1, further comprising:
    identifying, by the target storage device, another virtual node that corresponds to another directory entry of the plurality of directory entries as another mount point for another nested file system; and
    estimating, by the target storage device, another amount of data for the other nested file system based on in-use space at the other mount point for the other nested file system;
    wherein the estimated total amount of data is further based on the other amount of data for the other nested file system.

13. The method of claim 1, further comprising:
    receiving, by the target storage device, the existing data from the source file system; and
    while receiving the existing data from the source file system, receiving, by the target storage device, a request for a file in the existing data that has not yet been received by the target storage device;
    retrieving, by the target storage device, the file from the source file system;
    storing, by the target storage device, the file in the target file system; and
    in response to the request, transmitting, by the target storage device, the file.

14. One or more non-transitory tangible computer-readable storage media storing computer-executable instructions for performing a set of actions on a computing system, the set of actions comprising:
    initializing a target file system on a target storage device to which to migrate existing data from a source file system on a source storage device;
    traversing, by the target storage device, the source file system to identify a root and a plurality of directory entries within the root, wherein each of the plurality of directory entries corresponds to a virtual node, and wherein the root provides an entry point into the source file system;
    estimating, by the target storage device, an initial amount of data to be migrated to the target file system based on in-use space at the root of the source file system;
    while traversing the source file system, identifying, by the target storage device, a virtual node that corresponds to a directory entry of the plurality of directory entries as a mount point for a nested file system;
    estimating, by the target storage device, an amount of data for the nested file system based on in-use space at the mount point for the nested file system;
    determining, by the target storage device, an estimated total amount of data to be migrated from the source file system to the target file system based on the initial amount of data to be migrated and the amount of data for the nested file system; and
    transmitting, to a user device by the target storage device, the estimated total amount of data to be migrated from the source file system to the target file system.

15. The one or more non-transitory tangible computer-readable storage media of claim 14, further comprising:
    generating one or more estimated migration progress attributes based on the estimated total amount of data to be migrated.

16. The one or more non-transitory tangible computer-readable storage media of claim 15, wherein the estimated migration progress attributes include an estimated time remaining.

17. The one or more non-transitory tangible computer-readable storage media of claim 15, wherein the estimated migration progress attributes include an estimated percentage completed.

18. A system for estimating migration progress, the system comprising:
    a source storage device including a source file system managing existing data including a root providing an entry point into the source file system, the root having a plurality of directory entries, each of the plurality of directory entries corresponding to a virtual node; and
    a target storage device in communication with the source storage device to migrate the existing data to a target file system on the target storage device, the target storage device configured to:
        traverse the source file system to identify the root and the plurality of directory entries within the root,
        estimate an initial amount of data to be migrated to the target file system based on in-use space at the root of the source file system,
        while traversing the source file system, identify a virtual node that corresponds to a directory entry of the plurality of directory entries as a mount point for a nested file system,
        estimate an amount of data for the nested file system based on in-use space at the mount point for the nested file system,
        determine an estimated total amount of data to be migrated from the source file system to the target file system based on the initial amount of data to be migrated and the amount of data for the nested file system, and
        transmit, to a user device, the estimated total amount of data to be migrated from the source file system to the target file system.

19. The system of claim 18, wherein the target storage device is further configured to generate one or more estimated migration progress attributes based on the estimated total amount of data to be migrated.

20. The system of claim 18, wherein the virtual node represents a directory or a file.

* * * * *

UNITED STATES PATENT AND TRADEMARK OFFICE
CERTIFICATE OF CORRECTION

| | | |
|---|---|---|
| PATENT NO. | : 9,612,766 B2 | Page 1 of 1 |
| APPLICATION NO. | : 14/577702 | |
| DATED | : April 4, 2017 | |
| INVENTOR(S) | : Haley et al. | |

It is certified that error appears in the above-identified patent and that said Letters Patent is hereby corrected as shown below:

In the Specification

In Column 5, Line 45, delete "total total" and insert -- total --, therefor.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*